US005943943A

United States Patent [19]

Arai

[11] Patent Number: 5,943,943

[45] Date of Patent: Aug. 31, 1999

[54] RECIPROCATING COMPRESSOR

[75] Inventor: Katsuhiko Arai, Tokyo, Japan

[73] Assignee: Zexel Corporation, Tokyo, Japan

[21] Appl. No.: 09/001,208

[22] Filed: Dec. 30, 1997

[30] Foreign Application Priority Data

Jan. 17, 1997 [JP] Japan .................................... 9-019738

[51] Int. Cl.[6] .......................................................... F16J 1/04

[52] U.S. Cl. .................................................... 92/223; 92/71

[58] Field of Search .............................. 92/153, 155, 212, 92/223, 71; 428/650, 653, 652; 417/269

[56] References Cited

U.S. PATENT DOCUMENTS

| | | | |
|---|---|---|---|
| 4,519,119 | 5/1985 | Nakayama et al. | 92/223 |
| 4,701,110 | 10/1987 | Iijima | 417/269 |
| 5,129,378 | 7/1992 | Donahue et al. | 92/223 |
| 5,392,692 | 2/1995 | Rao et al. | 92/223 |
| 5,516,419 | 5/1996 | Pham et al. | 205/148 |
| 5,534,358 | 7/1996 | Troup-Packman | 428/652 |

*Primary Examiner*—Thomas E. Denion

*Attorney, Agent, or Firm*—Frishauf, Holtz, Goodman, Langer & Chick, P.C.

[57] ABSTRACT

A reciprocating compressor includes a cylinder block, a plurality of cylinder bores extending through the cylinder block, and a plurality of pistons slidably received in the plurality of cylinder bores, respectively. The cylinder block and the pistons are each formed of an aluminum-based material, and each of the plurality of pistons has a peripheral surface thereof covered with a thermal sprayed coating which is formed of a material having a smaller coefficient of linear expansion than one of the aluminum-based material. The thermal sprayed coating covering each of the pistons has at least one slit formed thereacross in a manner such that each of the at least one slit extends from the one end of each of the pistons to the other end of the same whereby part of the peripheral surface of the piston is exposed through the at least one slit.

6 Claims, 4 Drawing Sheets

RECIPROCATING COMPRESSOR

BACKGROUND OF THE INVENTION

1. Field of the Invention

This invention relates to a reciprocating compressor, such as a fixed capacity swash plate compressor, a variable capacity swash plate compressor, a wobble plate compressor, and an in-line compressor (crank compressor).

2. Description of the Prior Art

FIG. 1 is a partially sectional view showing a piston and a cylinder bore of a conventional variable capacity swash plate compressor.

The piston 107 is slidably received in the cylinder bore 106 formed through a cylinder block 101. When torque is transmitted from a drive source, not shown, the piston 107 reciprocates within the cylinder bore 106. As a result, the volume of a compression chamber within the cylinder bore 106 changes, whereby suction, compression and delivery of refrigerant gas are carried out sequentially.

The cylinder block 101 and the piston 107 are both formed of an aluminum-based material. The piston 107 has its peripheral surface covered with a ferrous thermal sprayed coating 170 for preventing abrasion and seizure of the piston 107.

However, the aluminum-based material forming the piston 107 has a coefficient of linear expansion (Al=$2.0\times10^{-6}$ mm/° C.) different from a coefficient of linear expansion (Fe=$1.1\times10^{-6}$ mm/° C.) of a ferrous material forming the thermal sprayed coating. Therefore, when the temperature within the cylinder bore 106 rises (during operation of the compressor), an inner peripheral surface of the cylinder bore 106 expands at a greater rate than the peripheral surface of the piston 107, and hence a clearance between the peripheral surface of the piston 107 and the inner peripheral surface of the cylinder bore 106 becomes larger. As a result, blow-by gas flowing from the compression chamber is increased in flow rate, which degrades compression efficiency and hence performance of the compressor.

FIG. 5 shows that the clearance between the peripheral surface of the piston 107 and the inner peripheral surface of the cylinder bore 106 is increased according to a rise in the temperature within the cylinder bore 106. A clearance A (see FIG. 1) at an ordinary temperature (10° C.) is 0.010 μm, while a clearance B (see FIG. 1) at a higher temperature (150° C.) is 0.050 μm. This means that the clearance is increased by 0.040 μm when the temperature rises by 140° C. from the ordinary temperature. The increase of the clearance results in an excessive increase in the flow rate of blow-by gas, which degrades compression efficiency of the compressor.

SUMMARY OF THE INVENTION

It is an object of the invention to provide a reciprocating compressor which has cylinder bores and respective pistons associated therewith, each constructed to expand and contract at substantially the same rate according to changes in the temperature within each cylinder bore so as to prevent an increase in the clearance between a peripheral surface of each piston and an inner peripheral surface of a corresponding cylinder bore to thereby reduce the flow rate of blow-by gas which degrades compression efficiency of the compressor.

To attain the above object, according to a first aspect of the invention, there is provided a reciprocating compressor including a cylinder block, a plurality of cylinder bores formed through the cylinder block, and a plurality of pistons slidably received in the cylinder bores, respectively, each of the pistons having one end and another end, the cylinder block and the pistons each being formed of an aluminum-based material, the pistons each having a peripheral surface thereof covered with a thermal sprayed coating which is formed of a material having a smaller coefficient of linear expansion than a coefficient of linear expansion of the aluminum-based material.

The reciprocating compressor according to the first aspect of the invention is characterized in that the thermal sprayed coating covering the each of the pistons has at least one slit formed thereacross in a manner such that each of the at least one slit extends from the one end of the each of the pistons to the another end of the each of the pistons whereby part of the peripheral surface of the each of the pistons is exposed through the at least one slit.

According to the reciprocating compressor of the invention, the thermal sprayed coating covering each piston has at least one slit formed thereacross in a manner such that each of the at least one slit extends from one end of each of the pistons to the other end of each piston whereby part of the peripheral surface of the piston is exposed through the at least one slit. Therefore, expansion of the piston is not hindered by the thermal sprayed coating when the temperature within the cylinder bore rises, and hence the outer diameter of the piston increases at the same rate that the inner diameter of the cylinder bore increases. As a result, the clearance between the peripheral surface of the piston and the inner peripheral surface of the cylinder bore is held substantially constant, whereby the flow rate of blow-by gas under an increased temperature is reduced.

Preferably, a plurality of slits formed at predetermined circumferential intervals around the each of the pistons constitute the at least one slit.

According to this preferred embodiment, the peripheral surface of each piston radially expands uniformly by virtue of the slits. Therefore, the clearance between the peripheral surface of the piston and the inner peripheral surface of the cylinder bore is held substantially constant along the whole circumference of the piston, which ensures smooth reciprocation of the piston.

More preferably, each of the at least one slit is formed in a winding manner.

According to this preferred embodiment, refrigerant gas (blow-by gas) is inhibited from flowing easily from a compression chamber positioned on one end side of the piston to the other end of the piston. Further, lubricating oil is separated from blow-by gas while the blow-by gas winds its way through the slit, and the separated lubricating oil is supplied to the clearance or interface between the peripheral surface of the piston and the inner peripheral surface of the cylinder bore, which promotes lubrication of the piston to thereby more positively prevent abrasion and seizure of the same.

Preferably, the material having the smaller coefficient of linear expansion than the coefficient of linear expansion of the aluminum-based material is a ferrous material.

To attain the above object, according to a second aspect of the invention, there is provided a reciprocating compressor including a cylinder block, a plurality of cylinder bores formed through the cylinder block, and a plurality of pistons slidably received in the cylinder bores, respectively, each of the pistons having one end and another end, the cylinder block and the pistons each being formed of an aluminum-based material, the pistons each having a peripheral surface thereof covered with a thermal sprayed coating formed of a ferrous material.

The reciprocating compressor according to the second aspect of the invention is characterized in that the thermal sprayed coating covering the each of the pistons is divided into a plurality of axial coating portions in a manner such that the axial coating portions each have circumferential opposite ends each formed to have a shape like the teeth of a comb, opposed ones of the circumferential opposite ends of adjacent ones of the axial coating portions being arranged in a manner mating with each other with space provided therebetween.

According to this reciprocating compressor, the thermal sprayed coating covering each piston is divided into a plurality of axial coating portions. Therefore, expansion of the piston is not hindered by the thermal sprayed coating when the temperature within the cylinder bore rises, and hence the outer diameter of the piston increases at the same rate that the inner diameter of the cylinder bore increases. As a result, the clearance between the peripheral surface of the piston and the inner peripheral surface of the cylinder bore is held substantially constant, whereby the flow rate of blow-by gas under an increased temperature is reduced.

Further, the axial coating portions each have circumferential opposite ends each formed to have a shape like the teeth of a comb, and opposed ones of the circumferential opposite ends of adjacent ones of the axial coating portions are arranged in a manner mating with each other with space provided therebetween. Therefore, refrigerant gas (blow-by gas) is inhibited from flowing easily from a compression chamber positioned on one end side of the piston to the other end of the piston. Further, lubricating oil is separated from blow-by gas while the blow-by gas winds its way through the space provided between the opposed ends of the adjacent axial coating portions, and the separated lubricating oil is supplied to the clearance or interface between the peripheral surface of the piston and the inner peripheral surface of the cylinder bore, which promotes lubrication of the piston to thereby more positively prevent abrasion and seizure of the same.

The above and other objects, features and advantages of the present invention will become more apparent from the following detailed description taken in conjunction with accompanying drawings.

DETAILED DESCRIPTION OF THE PREFERRED EMBODIMENT

The invention will now be described in detail with reference to drawings showing a preferred embodiment thereof.

Figure 3:
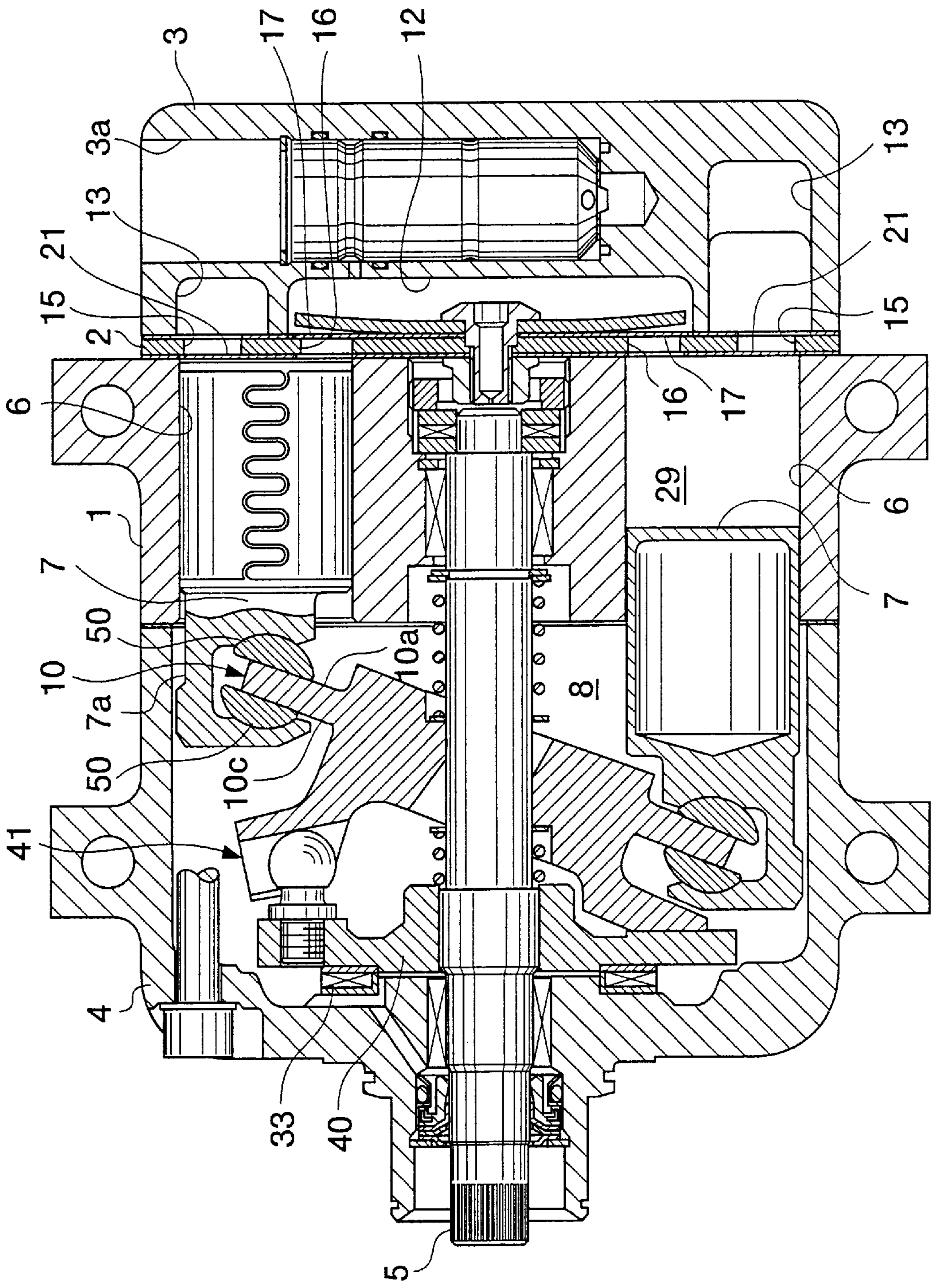
FIG. 3 is a longitudinal cross-sectional view showing the whole arrangement of the variable capacity swash plate compressor according to the embodiment.

Referring first to FIG. 3, there is shown the whole arrangement of a reciprocating compressor (variable capacity swash plate compressor) according to an embodiment of the invention.

The variable capacity swash plate compressor has a cylinder block 1 having one end thereof secured to a rear head 3 via a valve plate 2 and the other end thereof secured to a front head 4. The cylinder block 1 has a plurality of cylinder bores 6 formed therethrough at predetermined circumferential intervals about a shaft 5. Each cylinder bore 6 has a piston 7 slidably received therein.

Within the front head 4, there is formed a crankcase 8. The crankcase 8 has a swash plate 10 received therein, which rotates in unison with the shaft 5. The swash plate 10 is slidably and tiltably fitted on the shaft 5.

The piston 7 is connected to the swash plate 10 via a pair of shoes 50, each of which has a generally hemispherical shape. The shoes 50 are held at one end portion 7*a* of the piston 7 in a manner slidable on front-side and rear-side sliding surfaces 10*c* and 10*a* of the swash plate 10, respectively.

Within the rear head 3, there are formed a discharge chamber 12 and a suction chamber 13 surrounding the discharge chamber 12. Further, the rear head 3 is formed with a suction port 3*a* communicating with a refrigerant outlet port, not shown, of an evaporator, not shown.

The shaft 5 has a thrust flange 40 rigidly fitted on a front-side portion thereof for transmitting torque of the shaft 5 to the swash plate 10. The thrust flange 40 is rotatably supported on an inner wall of the front head 4 by a thrust bearing 33 arranged between the thrust flange 40 and the inner wall of the front head 4. The thrust flange 40 and the swash plate 10 are connected with each other via a linkage 41. The swash plate 10 can tilt with respect to a plane perpendicular to the shaft 5.

The cylinder block 1 and the piston 7 are both formed of an aluminum-based material (coefficient of linear expansion: $Al=2.0\times10^{-6}$ mm/° C.).

Figure 1:
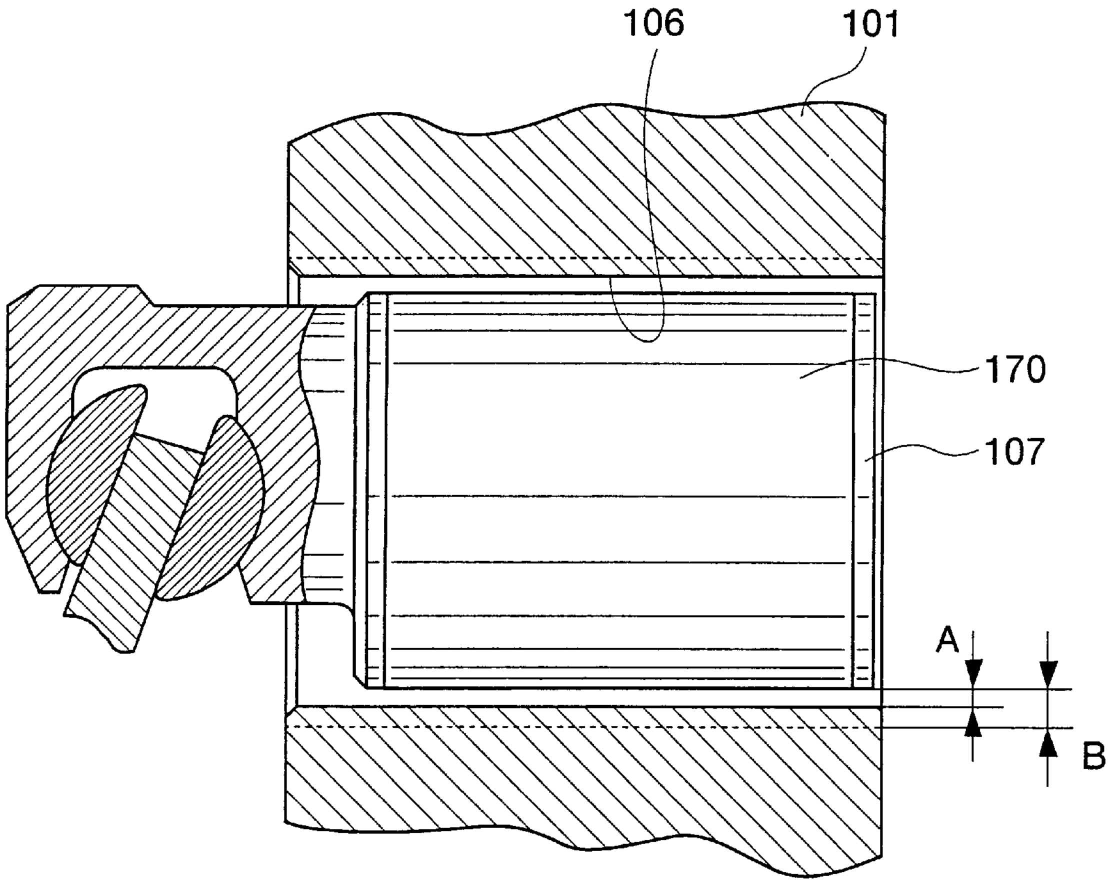
FIG.1 PRIOR ART
FIG. 1 is a partially sectional view showing a piston and a cylinder bore of a conventional reciprocating compressor.
Figure 2:
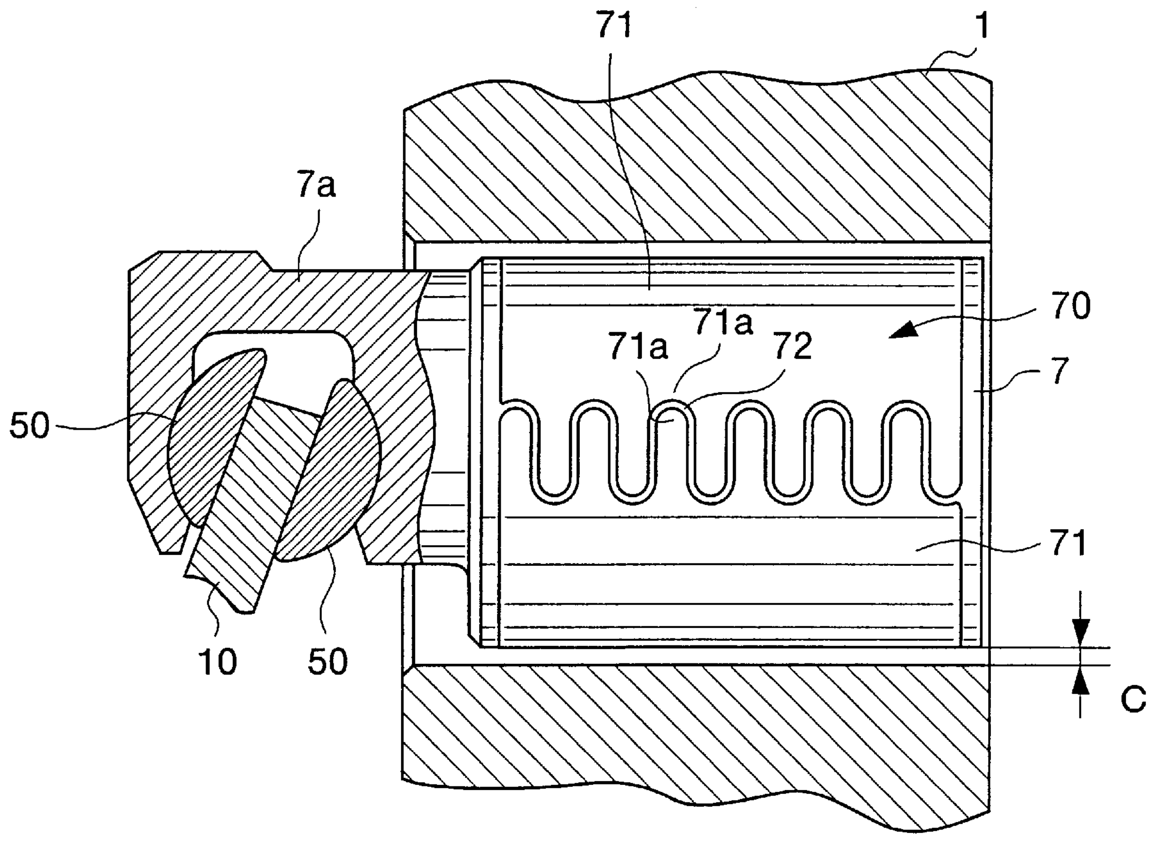
FIG. 2 is a partially sectional view showing a piston and a cylinder bore of a variable capacity swash plate compressor according to an embodiment of the invention.
Figure 4:
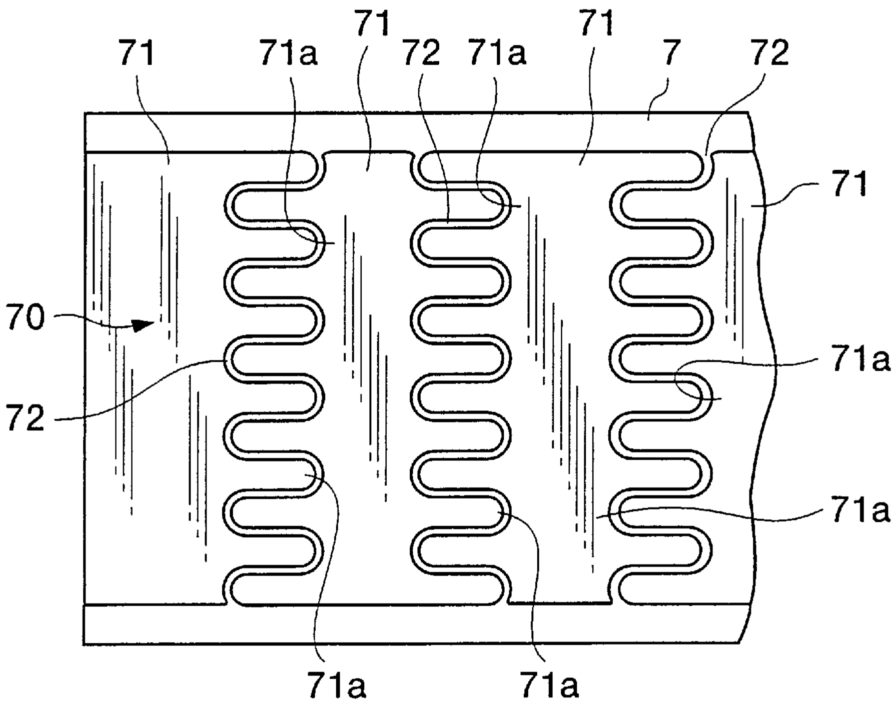
FIG. 4 is a development view of a thermal sprayed coating which covers a peripheral surface of the piston appearing in FIG. 2.

FIG. 2 is a partially sectional view showing the piston used in the reciprocating compressor (variable capacity swash plate compressor) according to the embodiment, and FIG. 4 is a development view of a thermal sprayed coating covering the peripheral surface of the FIG. 2 piston.

The piston 7 has the peripheral surface thereof covered with the thermal sprayed coating 70 of a ferrous material (having a smaller coefficient of linear expansion than that of the aluminum-based material). The coefficient of linear expansion of the ferrous material is $Fe=1.1\times10^{-6}$ mm/° C. The thermal sprayed coating 70 has a thickness of approximately 0.5 to 1.0 mm.

The thermal sprayed coating 70 is divided into a plurality of axial coating portions 71 (see FIG. 4). Each coating portion 71 has opposite circumferential ends in the form of comb teeth or a waveform, and adjacent ones of the coating portions 71 are arranged in a manner mating with each other at opposed circumferential ends thereof with a space (slit) 72 of approximately 1 mm provided therebetween.

The spaces 72 are axially formed at circumferential intervals around the piston 7. Each space 72 extends in a winding manner from one end of the piston 7 to the other end of the same (i.e. from the compression chamber 29 side to the crankcase 8 side), and a portion of the peripheral surface (the aluminum-based material) of the piston 7 is exposed through the space 72.

Next, the operation of the variable capacity swash plate compressor constructed as above will be described.

When torque of an engine, not shown, installed on an automotive vehicle, not shown, is transmitted to the shaft 5 to rotate the same, torque of the shaft 5 is transmitted to the swash plate 10 via the thrust flange 40 and the linkage 41 to cause rotation of the swash plate 10.

The rotation of the swash plate 10 causes relative rotation of the shoes 50, 50 on the sliding surfaces 10*a*, 10*c* of the swash plate 10 with respect to the circumference of the swash plate 10, whereby the torque transmitted from the swash plate 10 is converted into reciprocating motion of the piston 7. As the piston 7 reciprocates within the cylinder bore 6, the volume of the compression chamber 29 within the cylinder bore 6 changes. As a result, suction, compression and delivery of refrigerant gas are sequentially carried out in the compression chamber 29, whereby high-pressure refrigerant gas is discharged from the compression chamber 29 in an amount corresponding to an inclination of the swash plate 10. During the suction stroke, the suction valve 21 opens to draw low-pressure refrigerant gas from the suction chamber 13 into the compression chamber 29. During the discharge stroke, the discharge valve 17 opens to deliver high-pressure refrigerant gas from the compression chamber 29 into the discharge chamber 12.

Part of refrigerant gas within the compression chamber 29 flows into the crankcase 8 via the space 72 as blow-by gas.

Although the peripheral surface of the piston 7 is covered with the ferrous thermal sprayed coating 70, since the thermal sprayed coating 70 is divided into the plurality of axial coating portions 71 as described above, expansion of the piston is not hindered by the thermal sprayed coating 70 when the temperature within the cylinder bore 6 rises, and hence the outer diameter of the piston 7 becomes larger at the same rate that the inner diameter of the cylinder bore 6 is increased. As a result, the clearance C (see FIG. 2) between the peripheral surface of the piston 7 and the inner peripheral surface of the cylinder bore 6 is held substantially constant.

Figure 5:
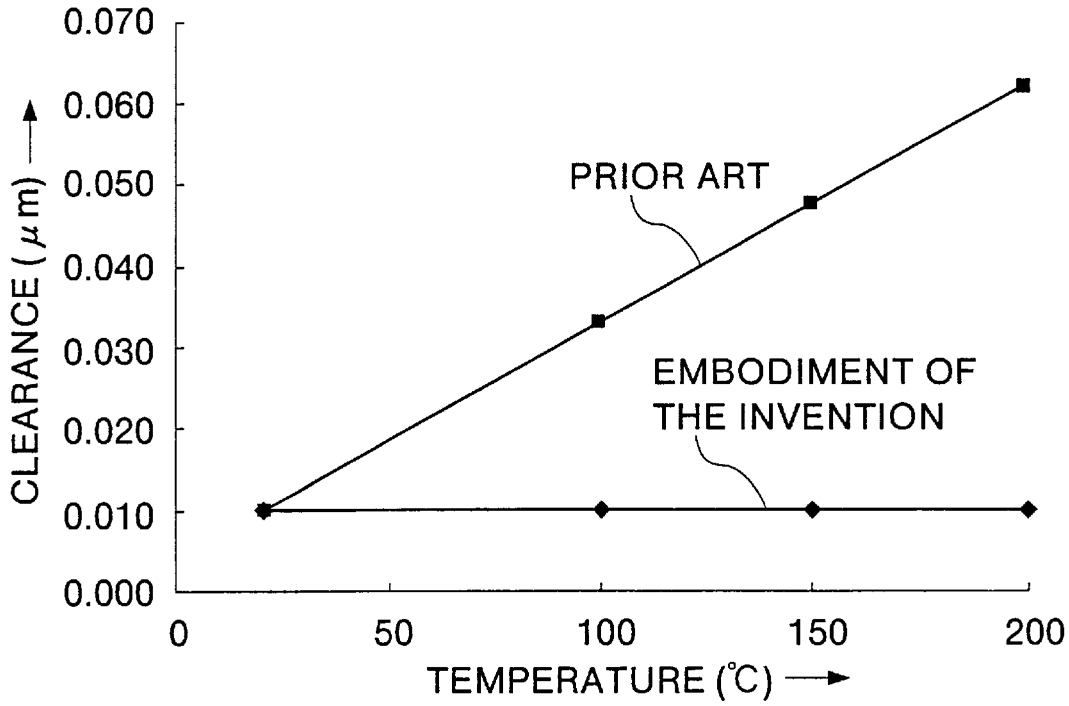
FIG. 5 is a graph showing the relationship between the clearance between the peripheral surface of the piston and the inner peripheral surface of the cylinder bore and the temperature within the cylinder bore.

FIG. 5 shows the relationship between the clearance between the peripheral surface of the piston 7 and the inner peripheral surface of the cylinder bore 6 and the temperature within the cylinder bore 6.

When the temperature rises by 140° C. from an ordinary temperature (10° C.), the clearance of the prior art (according to the prior art, the thermal sprayed coating covers the whole peripheral surface of the piston) increases by 0.040 $\mu$m, while the clearance of the present embodiment (according to the present embodiment, the thermal sprayed coating 70 is circumferentially divided into the axial coating portions 71) is held at 0.010 $\mu$m with substantially no increase.

Further, according to the embodiment, each coating portion 71 has opposite circumferential ends each in the form of comb teeth or a waveform, adjacent ones of the coating portions 71 are arranged in a manner mating with each other with the space 72 therebetween, and each space 72 extends in a winding manner between the adjacent coating portions 71, so that refrigerant gas (blow-by gas) is inhibited from flowing easily from the compression chamber 29 on the one end side of the piston 7 to the other end side of the same. Further, lubricating oil is separated from blow-by gas while the bloc-by gas winds its way through the space 72 between the adjacent coating portions 71, and the separated oil is supplied to the clearance or interface between the peripheral surface of the piston 7 and the inner peripheral surface of the cylinder bore 6.

According to the reciprocating compressor (variable capacity swash plate compressor) of the embodiment, the clearance C between the peripheral surface of the piston 7 and the inner peripheral surface of the cylinder bore 6 is held substantially constant as described above, which makes it possible to reduce the flow rate of blow-by gas under an elevated temperature to thereby enhance the compression efficiency of the compressor.

Further, since each space 72 extends in a winding manner, refrigerant gas (blow-by gas) is inhibited from flowing easily from the compression chamber 29 on the one end side of the piston 7 to the other end side of the same, which makes it possible to prevent degradation of the compression efficiency of the compressor. Moreover, since lubricating oil is separated from blow-by gas while the blow-by gas winds its way through the space 72 between the adjacent coating portions 71, and then the separated oil is supplied to the clearance or interface between the peripheral surface of the piston 7 and the inner peripheral surface of the cylinder bore 6, lubrication of the piston 7 is promoted, whereby abrasion and seizure of the piston 7 can be positively prevented.

Although in the above embodiment, description is made of a case where the invention is applied to a variable capacity swash plate compressor as the reciprocating compressor, this is not limitative, but the invention may be applied to other various types of reciprocating compressors, such as a fixed capacity swash plate compressor, a wobble plate compressor, and an in-line compressor (crank compressor).

It is further understood by those skilled in the art that the foregoing is the preferred embodiment of the invention, and that various changes and modifications may be made without departing from the spirit and scope thereof.

What is claimed is:

1. In a reciprocating compressor including a cylinder block, a plurality of cylinder bores formed through said cylinder block, and a plurality of pistons slidably received in said cylinder bores, respectively, each of said pistons having one end and another end, said cylinder block and said pistons each being formed of an aluminum-based material, said pistons each having a peripheral surface thereof covered with a thermal sprayed coating which is formed of a material having a smaller coefficient of linear expansion than a coefficient of linear expansion of said aluminum-based material, the improvement wherein said thermal sprayed coating covering said each of said pistons has at least one slit formed thereacross in a manner such that each of said at least one slit extends from said one end of said each of said pistons to said another end of said each of said pistons whereby part of said peripheral surface of said each of said pistons is exposed through said at least one slit.

2. A reciprocating compressor according to claim 1, wherein a plurality of slits formed at predetermined circumferential intervals around said each of said pistons constitute said at least one slit.

3. A reciprocating compressor according to claim 1, wherein each of said at least one slit is formed in a winding manner.

4. A reciprocating compressor according to claim 2, wherein each of said at least one slit is formed in a winding manner.

5. A reciprocating compressor according to claim 1, wherein said material having said smaller coefficient of linear expansion than said coeffiecient of linear expansion of said aluminum-based material is a ferrous material.

6. In a reciprocating compressor including a cylinder block, a plurality of cylinder bores formed through said cylinder block, and a plurality of pistons slidably received in said cylinder bores, respectively, each of said pistons having one end and another end, said cylinder block and said pistons each being formed of an aluminum-based material, said pistons each having a peripheral surface thereof covered with a thermal sprayed coating formed of a ferrous material, the improvement wherein said thermal sprayed coating covering said each of said pistons is divided into a plurality of axial coating portions in a manner such that said axial coating portions each have circumferential opposite ends each formed to have a shape like the teeth of a comb, opposed ones of adjacent ones of said circumferential opposite ends of said axial coating portions being arranged in a manner mating with each other with space provided therebetween.

* * * * *